United States Patent [19]

Day et al.

[11]  4,455,384
[45]  Jun. 19, 1984

[54] CHEMICALLY DURABLE NITROGEN CONTAINING PHOSPHATE GLASSES USEFUL FOR SEALING TO METALS

[75] Inventors: Delbert E. Day, Rolla, Mo.; James A. Wilder, Jr., Albuquerque, N. Mex.

[73] Assignee: The United States of America as represented by the United States Department of Energy, Washington, D.C.

[21] Appl. No.: 447,847

[22] Filed: Dec. 8, 1982

[51] Int. Cl.$^3$ .............................................. C03C 3/16
[52] U.S. Cl. .......................................... 501/15; 65/32;
    65/59.1; 501/24; 501/42; 501/46; 501/47;
    501/48; 501/73; 501/27
[58] Field of Search ........................ 65/134, 32, 59 R;
    501/48, 15, 24, 42, 46, 47, 73

[56]  References Cited

U.S. PATENT DOCUMENTS

| | | | |
|---|---|---|---|
| 3,709,723 | 1/1973 | Watanabe et al. | 501/40 |
| 3,856,494 | 12/1974 | Kitano et al. | 65/32 |
| 3,930,873 | 1/1976 | Kaes et al. | 501/48 |
| 4,070,198 | 1/1978 | Chyung et al. | 65/32 |
| 4,123,248 | 10/1978 | Drake | 501/48 |
| 4,202,700 | 5/1980 | Wilder | 501/48 |

*Primary Examiner*—Helen M. McCarthy
*Attorney, Agent, or Firm*—Armand McMillan; Albert Sopp; Michael F. Esposito

[57]  ABSTRACT

The chemical durability of alkali phosphate glasses is improved by incorporation of up to 23 weight percent of nitrogen. A typical phosphate glass contains: 10 to 60 mole % of $Li_2O$, $Na_2O$ or $K_2O$; 5–40 mole % of BaO or CAO; 0–1 to 10 mole % of $Al_2O_3$; and 40–70 mole % of $P_2O_5$. Nitrides, such as AlN, are the favored additives.

11 Claims, No Drawings

CHEMICALLY DURABLE NITROGEN CONTAINING PHOSPHATE GLASSES USEFUL FOR SEALING TO METALS

The U.S. Government has rights in this invention pursuant to Contract No. DE-AC04-76DP00789 between the U.S. Department of Energy and Western Electric Company.

BACKGROUND OF THE INVENTION

This invention relates to an improvement in phosphate glasses whereby they have a significantly enhanced chemical durability, i.e., corrosion resistance.

Alkali phosphate glasses have low melting temperatures, moderate to high thermal expansion coefficients, and other optical properties which are highly desirable for many uses, such as in glass/metal seals such as hermetic seals, low temperature glass solders, optical glass elements such as lenses, etc. However, the ability to exploit these properties for commercial use in practical applications has been severely limited by their relatively high solubility in water and their low weathering resistance.

In the past, the chemical durability of phosphate glasses has been improved to acceptable limits by addition of alkaline earth oxides, $Al_2O_3$, $B_2O_3$, $SiO_2$, and similar oxides. (See "Chemical Durability of Phosphate Glasses ", J. A. Wilder, Jr. and J. K. Johnstone, presented at the 81st Annual Meeting of the American Ceramic Society, Cincinnati, Ohio, Apr. 28–May 2, 1979, to be published.)

However, such additions unacceptably alter other properties of the base glasses. They increase the melting temperature or lower the thermal expansion coefficient, whereby the resultant glasses often no longer possess the desired properties necessary for the intended practical use.

Of course, other methods have been employed to increase chemical durability in other unrelated glass systems such as those of U.S. Pat. Nos. 3,607,321 and 4,087,511. In addition, it has been known to utilize phosphate glass-type compositions in order to achieve controlled release of a nitrogen-containing ingredient such as fertilizer. (U.S. Pat. No. 4,123,248.)

It is also noted that nitride ion has been employed in various unrelated glasses in the past. See, e.g., Loehman, J. American Ceramic Society, 62, 9–10, 491–494 (1979); Loehman et al, J. American Ceramic Society, 63, 3–4, 144–148 (1980); and Leedecke et al, J. American Ceramic Society, 63, 3–4, 190–193 (1980).

SUMMARY OF THE INVENTION

Accordingly, it is an object of this invention to provide phosphate glasses having increased chemical durability.

It is another object of this invention to provide such glasses with retention of the desired relevant properties of the base phosphate glass.

It is a further object of this invention to provide a method for preparing such glasses and for achieving chemical durability therein.

It is another object of this invention to provide such glasses and such a method wherein the chemical durability of the phosphate glass is on the order of or even exceeds that of commercial soda-lime-silica window glass.

Upon further study of the specification and appended claims, further objects and advantages of this invention will become apparent to those skilled in the art.

These objects have been obtained by providing, in a phosphate glass, the improvement wherein the glass further comprises about 0.15 to 23 wt. % of nitrogen.

DETAILED DISCUSSION

The present invention is generically applicable to phosphate glass systems such as those disclosed in U.S. Pat. No. 4,202,700 and similar systems. The entire disclosure of U.S. Pat. No. 4,202,700 is incorporated by reference herein.

Typical such base phosphate glass systems whose chemical durability can be improved by this invention include those comprising 10–60 mole % of $Li_2O$, $Na_2O$ or $K_2O$; 5–40 mole % of $BaO$ or $CaO$; 0.1–10 mole % of $Al_2O_3$; and 40–70 mole % of $P_2O_5$ or, optionally, further comprising up to 0.1 mole % of Pt; up to 10 mole % of $TiO_2$, $ZrO_2$, $Y_2O_3$, $La_2O_3$ or $Ta_2O_5$; up to 10 mole % of $CoO$, $CuO$, $SnO$, $Ag_2O$, $Cr_2O_3$ or $NiO$; or up to 10 mole % of $PbO$, $WO_3$, $B_2O_3$, $SiO_2$, $GeO_2$ or $ZnO$.

Generally, about 0.15 wt. % of nitride ion is added to the base phosphate glass composition in order to achieve significant enhancement of chemical durability. Theoretically, up to 23 wt. % of nitrogen, i.e., nitride ion, can be added to the base phosphate glasses. Preferably, the phosphate glass will comprise 0.15 to 2.0 wt. % of nitrogen, especially 0.17 to 0.7 wt. % of nitrogen.

The nitrogen is added to the base phosphate glass compositions, preferably, by addition of aluminum nitride (AlN). Generally, any system compatible metal nitride can be used to effect the requisite addition of nitrogen. For example, other suitable nitrides include $Si_3N_4$, YN, LaN, BN, $Ca_3N_2$, $Li_3N$, etc. Amounts of raw material nitride to be used in preparing the glass can be calculated readily in correspondence with the particular weight percentage of nitrogen ion which is desired in the improved phosphate glass of this invention. In general, under most preparation conditions, not all of the nitrogen contained in the raw material nitride will be present in the improved phosphate glass as nitride ion. However, for all nitrides and for all base phosphate compositions, where necessary, a few routine preliminary experiments can be performed in order to determine precisely which amounts of starting material nitrides will result in the desired final amount of nitride ion in the phosphate glass composition. For example, theoretically, for every one weight percent of AlN which is provided as a raw material, there will be included in the base phosphate composition, 0.34 wt. % of nitride ion and 0.66 wt. % of aluminum ion. In practice, somewhat less than these theoretical amounts are achieved in the improved glass of this invention. As mentioned, precisely what percentage of the theoretical amount will be included in the glass will be dependent upon the precise conditions utilized during the preparation of the glass. The relationship of observed amount and theoretical amount is routinely determinable using fully conventional parametric preliminary experiments. Typically, for AlN addition for example, satisfactory results are achieved by employing amounts of AlN of about 0.5–2 wt. %.

The glasses of this invention can be prepared in various ways. They can be prepared by adding the raw material nitride to the batch ingredients used in preparing the glass itself or by remelting the base glass in the presence of the requisite amount of raw material nitride.

In addition, the glasses can be prepared by simply heating a melt of the base phosphate glass in a nitrogen atmosphere or while bubbling ammonia therethrough. In general, the amount of nitride ion achieved in the glass of this invention relative to the amount of raw material nitride employed will be higher when the already-formed glass is remelted with the nitride than when the nitride is added to the initial batch ingredients; will be higher in the latter case than when the glass is remelted in a nitrogen atmosphere; and higher in the latter case than when ammonia is bubbled through the glass melt.

In general, carrying out any of these methods of preparation involves only fully conventional practices and considerations. Unless indicated otherwise herein, all details of the preparation of the glass are in conformance with the conventional procedures known to those skilled in the art, such as those described in U.S. Pat. No. 4,202,700.

Typically, a remelting operation, such as those reported in the following examples, is conducted as follows. The base glass is melted using fully standard glass melting techniques, i.e., essentially the glass is simply put in a furnace and melted. Thereafter, while in the molten condition, the melt is fritted, i.e., it is conventionally cast out into water to produce particles of the glass. These particles are then placed in a furnace along with the requisite amount of aluminum nitride or other nitride powder and are remelted in an inert atmosphere, typically and preferably nitrogen. Typically, a melting schedule for the incorporation of the nitride ions using this technique involves raising the glass to about 200° for about 1 hour, subsequently, raising it to about 1100° C. for about 2 hours; dropping the temperature to about 900° C. for about 2 hours; and then, casting out the glass to room temperature.

In the alternative method of adding the nitride to the batch ingredients, the powders of the starting materials are conventionally mixed and placed in a conventional furnace. The temperature is then raised to about 700°-1100° C., more typically, 800° C.-1000° C. and held there for about 1 hour, whereby the batch ingredients are melted to form the molten glass. As demonstrated in the examples below, the resultant properties in the glass of this invention will vary with the particular heating conditions employed, i.e., the amount of nitride ion which is incorporated into the glass will vary with the heating conditions employed. In general, the heating conditions will be chosen in order to achieve the highest nitride ion concentration in the glass. As would be expected, at the higher combinations of time and temperature, more nitride ion is incorporated. The desired or optimum time/temperature conditions will be routinely chosen using a few preliminary experiments so that the desired amount of nitride concentration in the phosphate glass can be effected conveniently. Generally, of course, the process will be carried out at the higher temperatures in order to provide the shortest times possible.

Without intending to limit the scope of this application in any way whatsoever, it is felt that the addition of nitrogen to phosphate glasses appears to create a more highly cross-linked $(PO_4)_n$ network structure as indicated by the slightly lower thermal expansion coefficients and higher softening temperatures of the aluminum nitride containing glasses prepared in the examples. This more highly cross-linked network could result from either three single bonded $O^{2-}$ ions being replaced by $2N^{3-}$ ions or by three terminal $OH^-$ groups in the phosphate being replaced by one $N^{3-}$ ion. It is felt that elimination of these terminal $O^{2-}$ or $OH^-$ ions in the network structure is a key phenomenon underlying the improved chemical durability of the phosphate glasses of this invention, since these provide the most probable sites for hydrolysis which is the underlying mechanism of chemical corrosion.

The glasses of this invention can be used for all of the conventional purposes for which phosphate glasses have been employed in the past. See, e.g., U.S. Pat. No. 4,202,700. For example, they can be used as the glass component in glass/metal seals (hermetic seals), as low temperature glass solders, or as optical glass for various optical elements such as lenses. A major use is in the glass/metal seal application wherein they are among the best candidates so far developed for sealing to high expansion, low melting metals, particularly and preferably aluminum, aluminum alloys, stainless steel, copper etc. The phosphate glasses of this invention are particularly useful in such applications since they have a chemical durability on the order of that of window glass.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

The data in Table 1 below illustrate the improvement in chemical durability (i.e., lower dissolution rate in water) that has been achieved by incorporating nitrogen into a base phosphate glass of the formula $40Na_2O \cdot 10BaO \cdot 49P_2O_5 \cdot 1Al_2O_3$, in mole %. This glass was prepared using the remelting procedure described above. Aluminum nitride was dissolved into the glass by grinding the original premelted glass to about 20 mesh, adding the desired amount of aluminum nitride powder and remelting in a nitrogen atmosphere as described. The results show that the dissolution rate of the glass containing 1.0 wt. % of aluminum nitride is as good as that of soda-lime-silica window glass ($5 \times 10^{-8}$ gm/(cm²min)).

The base glass composition was also remelted without aluminum nitride in a nitrogen atmosphere. As the data show, the chemical durability of the base glass was also improved using this technique, although the improvement was not as large as with an aluminum nitride addition of 1.0 wt. %. In the nitrogen atmosphere without AlN addition, powder of the premelt glass was

TABLE 1

PROPERTIES OF $40Na_2O.10BaO.49P_2O_5.1Al_2O_3$, MOLE %, GLASS CONTAINING AlN AND REMELTED IN NITROGEN

| Property | Standard As Melted In Air | Wt % AlN Added | | | |
|---|---|---|---|---|---|
| | | 0 | 0.5 | 1.0 | 1.5 |
| Dissolution rate* in water at 20° C., gm/cm² · min | $3.6 \times 10^{-6}$ | $4.8 \times 10^{-7}$ | $2.1 \times 10^{-7}$ | $3.9 \times 10^{-8}$ | $5.0 \times 10^{-8}$ |
| Dilatometric softening temp., °C. | 310 | 329 | 331 | 338 | 360 |
| Thermal expansion coefficient, 25° to 250° C., per °C. | $200 \times 10^{-7}$ | $208 \times 10^{-7}$ | $197 \times 10^{-7}$ | $196 \times 10^{-7}$ | $196 \times 10^{-7}$ |

*Samples in de-ionized water for 3 days 20° C.

heated at 200°–400° C. in a nitrogen atmosphere and then was melted. It is theorized that, under these conditions, various nitrides were formed on the exterior surface of the phosphate glass particles which, subsequently then dissolved in the glass during melting.

The data in Table I also show that the thermal expansion coefficient and dilatometric softening point also vary with the amount of aluminum nitride added. However, advantageously, the change in these properties is small compared with the nearly 100 fold reduction in dissolution rate. An addition of aluminum nitride of 1 wt. % reduces the thermal expansion coefficient by only 2-4%. In order to achieve the same dissolution rate provided by this 1% aluminum nitride addition (i.e., $3.9 \times 10^{-8}$ gm/(cm².min)), about 5 mole % of $Al_2O_3$ must be added to the base glass composition in accordance with prior art processes. However, such an addition reduces the thermal expansion coefficient by about 6–8% making the glass significantly more difficult to melt.

The glass transition temperature of the standard glass, as melted in air, was 300° C. while that of the glass containing a 1.5 wt. % aluminum nitride addition was 330° C. Furthermore, for the standard base glass as melted in air, by differential thermal analysis, there were measured an exothermic peak due to crystallization at 398° C. and an endothermic peak due to crystal melting at 650° C.; whereas, for the glass to which was added 1.5 wt. % of aluminum nitride, the exothermic peak increased to 450° C. while the endothermic peak vanished. Initial nitrogen analysis has indicated that in the glass prepared by adding 1.5 wt. % of aluminum nitride, about 0.5 wt. % of nitride ion was included, which agrees substantially with theory.

EXAMPLE 2

The data in Table 1 were obtained by measurements on a phosphate glass of this invention having improved chemical durability obtained by adding 1 wt. % of aluminum nitride directly to the glass batch based on a base glass composition of $40Na_2O.10BaO.1Al_2O_3.49P_2O_5$ (mol %).

TABLE 2

PROPERTIES OF $40Na_2O.10BaO.1Al_2O_3.49P_2O_5$ (mole %) WITH 1 wt % AlN ADDED TO GLASS MELT

| Property | Standard As Melted in Air | MELTING TEMPERATURES | | | |
|---|---|---|---|---|---|
| | | 800° C. | 900° C. | 1000° C. | 1100° C. |
| Dissolution rate at 20° C. $\left(\frac{gm}{cm^2 \cdot min}\right)$ | $3.6 \times 10^{-6}$ | $4 \times 10^{-7}$ | $3.8 \times 10^{-7}$ | $4 \times 10^{-7}$ | $8 \times 10^{-8}$ |
| Glass transition temperature, °C. | 310 | 324 | 317 | 324 | 321 |
| Thermal expansion 25° C. to 250° C, per °C. | $208 \times 10^{-7}$ | $206 \times 10^{-7}$ | $203 \times 10^{-7}$ | $209 \times 10^{-7}$ | $203 \times 10^{-7}$ |

*Glass of composition $40Na_2O.10BaO.1Al_2O_3.49P_2O_5$ (mole %) melted at 800° C. without AlN addition.

The glass was prepared using the method described above. At each temperature shown in Table 2, a portion of the glass melt was quenched to room temperature in order to enable measurement of the sample. As can be seen, the dissolution rate decreases with increasing melting temperature, showing that more nitrogen is incorporated into the glass structure. In addition, the glass transition temperature is increased slightly and the thermal expansion is slightly decreased. These trends indicate a more highly cross-linked $(PO_4)$ network structure.

EXAMPLE 3

Using the method of example 2, the effect of adding 2 wt. % of aluminum nitride to a phosphate glass was determined. The results are shown in Table 3 below. In addition, the effect of a 1 wt. % aluminum nitride addition on different phosphate glass base compositions was also determined and the results are shown in Table 4. Furthermore, the effects on the glass transition temperature of a particular base glass composition by varying the amount of aluminum nitride added are shown in Table 5.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

$Y_2O_2$, $La_2O_3$ or $Ta_2O_5$; up to five mole percent CoO, CuO, SnO, $Ag_2O$, $Cr_2O_3$ or NiO; or up to ten mole percent PbO, $WO_3$, $B_2O_3$, $SiO_2$, $GeO_2$ or ZnO.

3. A phosphate glass of claim 1 comprising about 0.15 to 2.0 wt. % of nitrogen.

4. A phosphate glass of claim 3 comprising about 0.17

TABLE 3

Properties of $40Na_2O.10BaO.1Al_2O_3.49P_2O_5$ (mole %) With 2 wt % AlN Added to Glass Melt

| Property | Standard*, As Melted in Air | Melting Temperatures of AlN Containing Glass | | | |
|---|---|---|---|---|---|
| | | 800° C. | 900° C. | 1000° C. | 1100° C. |
| Dissolution rate at 20° C. $\left(\frac{gm}{cm^2 \cdot min}\right)$ | $3.6 \times 10^{-6}$ | — | $3.6 \times 10^{-7}$ | $2.5 \times 10^{-7}$ | — |
| Glass Transition Temperature, °C. | 310 | 325 | 330 | 340 | 340 |
| Thermal Expansion, 25° C. to 250° C., per °C. | $208 \times 10^{-7}$ | $195 \times 10^{-7}$ | $193 \times 10^{-7}$ | $199 \times 10^{-7}$ | $203 \times 10^{-7}$ |

*Glass of Composition $40Na_2O.10BaO.1Al_2O_3.49P_2O_5$ (mole %) melted at 800° C., no AlN

TABLE 4

EFFECT OF NITROGEN ADDITION ON PHOSPHATE GLASSES OF VARIOUS COMPOSITIONS

| | Dissolution rate* in water at 20° C., gm/cm² · min | Glass Transition Temperature (C.) | Thermal Expansion Coefficient, 25° C. to 250° C., per °C. |
|---|---|---|---|
| $25Na_2O.25K_2O.10WO_3.4O.P_2O_5$ (mole %) | $4.5 \times 10^{-5}$ | 260 | $228 \times 10^{-7}$ |
| same with 1 wt. % AlN | $2.2 \times 10^{-5}$ | 304 | $233 \times 10^{-7}$ |
| $25NaO_2.25K_2O.4Al_2O_3.46P_2O_5$ (mole %) | $4.9 \times 10^{-5}$ | 255 | $229 \times 10^{-7}$ |
| same with 1 wt. % AlN | $1.4 \times 10^{-5}$ | 294 | $233 \times 10^{-7}$ |
| $25NaO_2.25K_2O.5WO_3.4Al_2O_3.41P_2O_5$ (mole %) | $2.7 \times 10^{-6}$ | 317 | $218 \times 10^{-7}$ |
| same with 1 wt. % AlN | — | 340 | $227 \times 10^{-7}$ |

*Samples in de-ionized water for 3 days at 20° C.

TABLE 5

Comparison of Glass Transition Temperature for Varying Amount of AlN Added to CON-2* Glass and Melted at Different Temperatures

| Melting Temperature | Glass Transition Temperatures | | | |
|---|---|---|---|---|
| | CON-2 Without AlN | CON-2 + ½% AlN (81-294) | CON-2 + 1% AlN (82-114) | CON-2 + 2% AlN (82-120) |
| 800° C. | 340° C. | 342° C. | 337° C. | 354° C. |
| 900° C. | 340° C. | 356° C. | 343° C. | 357° C. |
| 1000° C. | 340° C. | 355° C. | 347° C. | 357° C. |
| 1100° C. | 340° C. | 355° C. | 363° C. | 378° C. |

*CON-2 Glass Has Composition of $27Na_2O.20BaO.3Al_2O_3.50P_2O_5$ (mole %)

What is claimed is:

1. An alkali phosphate glass comprising 10–60 mole percent $Li_2O$, $Na_2O$ or $K_2O$, 5–40 mole percent BaO or CaO, 0.1–10 mole percent $Al_2O_3$, and 40–70 mole percent $P_2O_5$, and being of enhanced chemical durability due to said glass further comprising about 0.15 to 23 wt percent of nitrogen added in the form of a metal nitride.

2. The phosphate glass of claim 1 comprising up to 0.1 mole percent Pt; up to 10 mole percent $TiO_2$ $ZrO_2$, to 0.7 wt. % of nitrogen.

5. A phosphate glass of claim 1 wherein the nitrogen is added in the form of AlN.

6. A phosphate glass of claim 3 wherein the nitrogen is added in the form of AlN.

7. A phosphate glass of claim 4 wherein the nitrogen is added in the form of AlN.

8. A phosphate glass of claim 1 wherein the nitrogen is added in the form of $Si_3N_4$, YN, LaN or BN.

9. A phosphate glass of claim 1 wherein the nitrogen is added in the form of $Ca_3N_2$ or $Li_3N$.

10. A method of improving the chemical durability of an alkali phosphate glass comprising 10–60 mole percent $Li_2O$, $Na_2O$ or $K_2O$, 5–40 mole percent BaO or CaO, 0.1–10 mole percent $Al_2O_3$, and 40–70 mole percent $P_2O_5$, by incorporating therein 0.15 to 23 wt percent nitrogen in the form of a metal nitride added to the molten glass.

11. In a glass to metal seal, the improvement wherein the glass is a phosphate glass of claim 1.

* * * * *